(12) United States Patent
Suda et al.

(10) Patent No.: US 7,264,756 B2
(45) Date of Patent: Sep. 4, 2007

(54) OPTICAL MEASUREMENT SUBSTRATE AND FABRICATION METHOD FOR THE SAME

(75) Inventors: Yoshihisa Suda, Fujioka (JP); Atsunori Satake, Fujioka (JP); Kunitaka Yamada, Fujioka (JP); Hiroko Kaneko, Tsukuba (JP); Kaoru Kato, Tsukuba (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 10/971,702

(22) Filed: Oct. 25, 2004

(65) Prior Publication Data

US 2005/0214164 A1 Sep. 29, 2005

(30) Foreign Application Priority Data

Oct. 27, 2003 (JP) .............................. 2003-366197

(51) Int. Cl.
| | |
|---|---|
| *C01B 31/00* | (2006.01) |
| *B32B 5/02* | (2006.01) |
| *B32B 27/04* | (2006.01) |
| *B32B 27/12* | (2006.01) |
| *G01N 21/00* | (2006.01) |

(52) U.S. Cl. .................... 264/29.1; 422/50; 422/82.05; 422/68.1; 436/43; 436/164

(58) Field of Classification Search ............... 264/29.1; 422/50, 82.05, 68.1; 436/43, 164
See application file for complete search history.

(56) References Cited

U.S. PATENT DOCUMENTS

| 6,143,412 A | * | 11/2000 | Schueller et al. ........... 428/408 |
| 6,500,679 B2 | | 12/2002 | Akimoto et al. |
| 6,730,731 B2 | * | 5/2004 | Tobita et al. ............... 524/495 |
| 2003/0096104 A1 | * | 5/2003 | Tobita et al. ............... 428/332 |

FOREIGN PATENT DOCUMENTS

| JP | 2000-275208 | 10/2000 |
| JP | 2002-14100 | 1/2002 |
| JP | 2002-340802 | 11/2002 |
| JP | 2002-365293 | 12/2002 |
| JP | 2003-121438 | 4/2003 |

* cited by examiner

*Primary Examiner*—Brian Sines
(74) *Attorney, Agent, or Firm*—Foley & Lardner LLP

(57) ABSTRACT

The invention provides at a relatively low cost a carbon substrate that is formed from an opaque material and that has an extremely flat surface so that optical measurements can be made on the substrate. Graphite powder with a particle size of 10 μm or less is mixed in a thermosetting resin such as a furan resin, and the mixture is molded into a sheet and calcined at 1400° C. in an inert atmosphere to produce a carbon substrate whose surface is then ground flat.

2 Claims, 10 Drawing Sheets

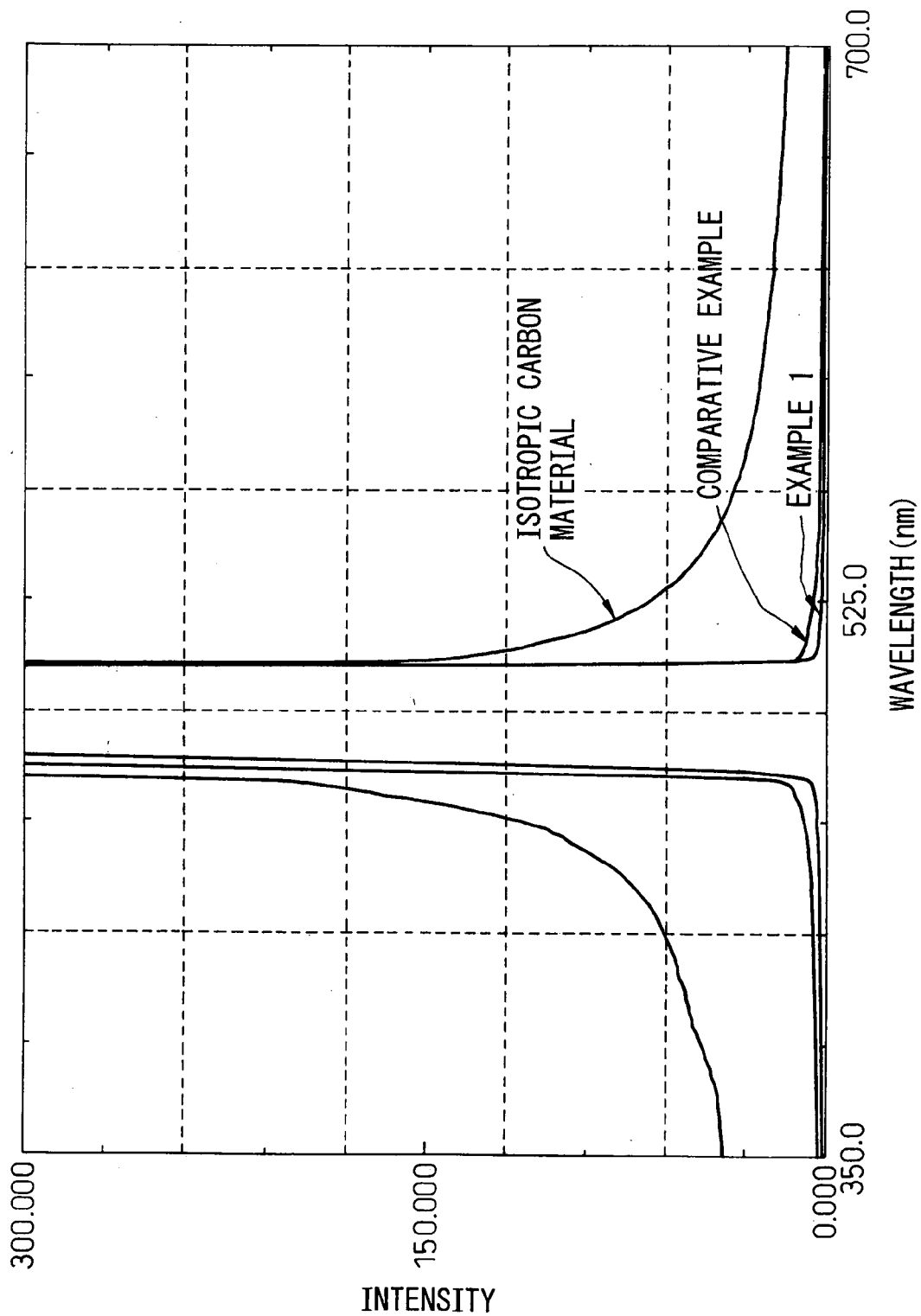

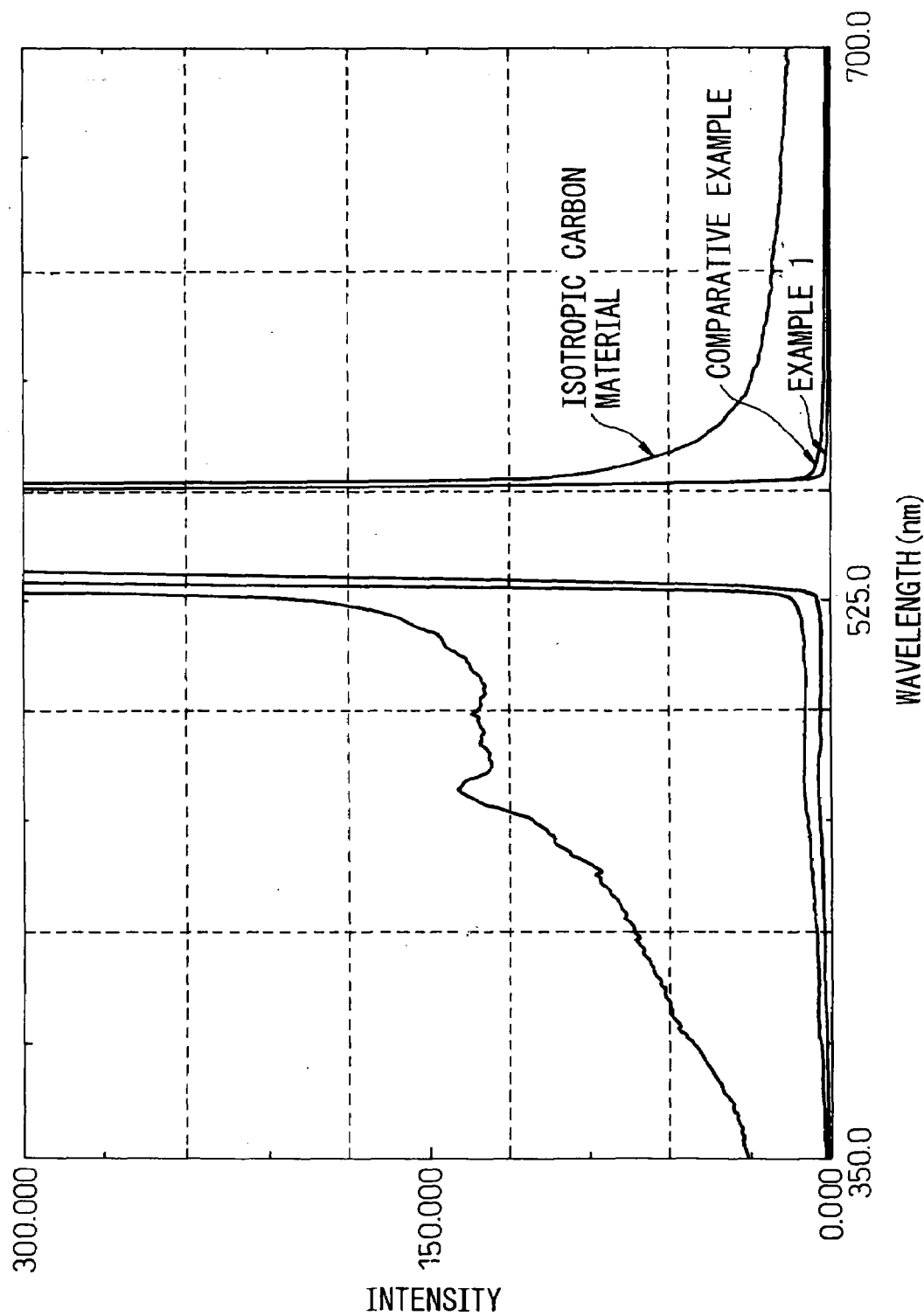

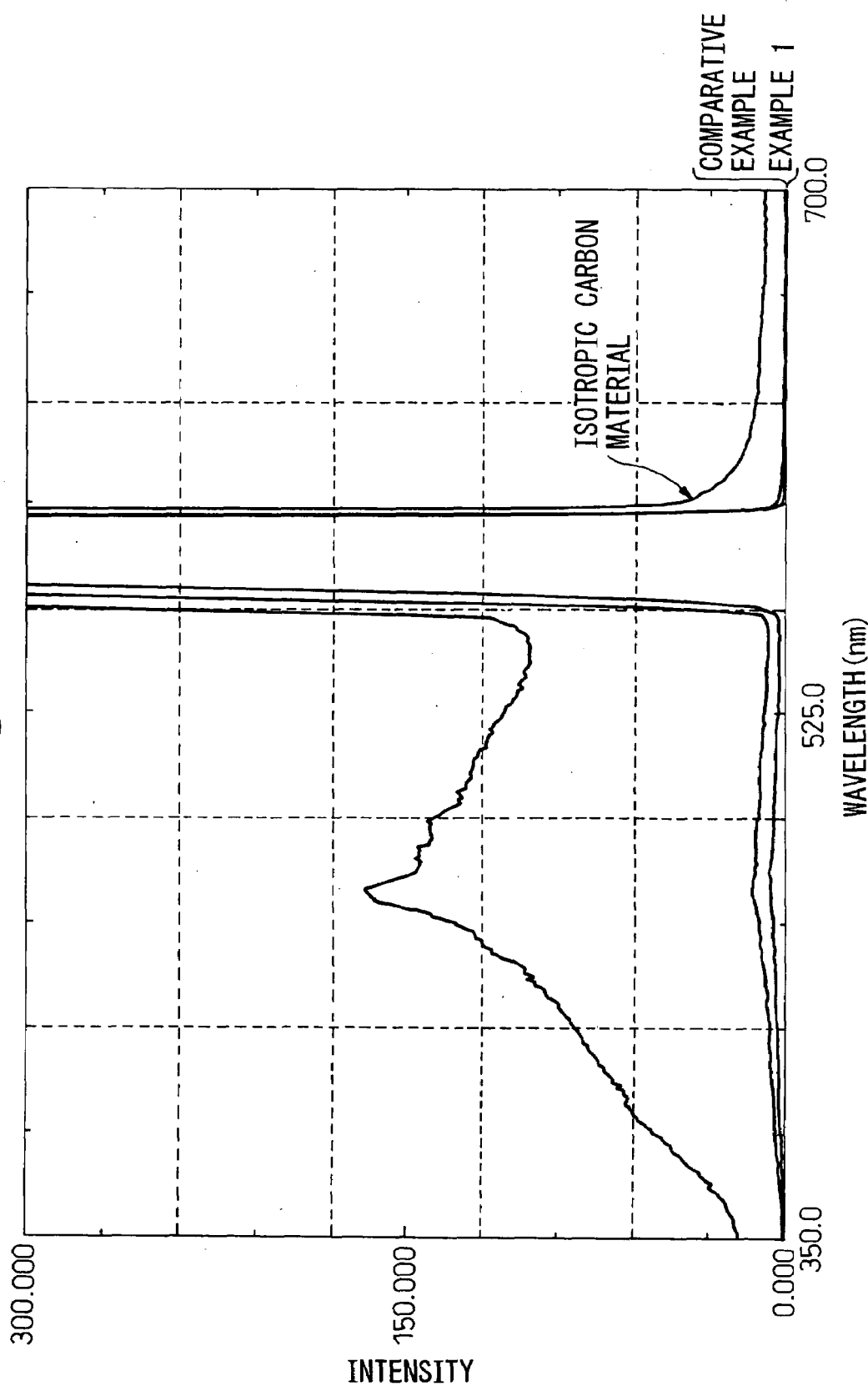

OPTICAL MEASUREMENT SUBSTRATE AND FABRICATION METHOD FOR THE SAME

BACKGROUND OF THE INVENTION

1. Field of the Invention

The present invention relates to an optical measurement carbon substrate that is suitable for mounting thereon a specimen such as a powder, biological molecules, or the like, for observation in a reflected light optical system.

A substrate for a DNA chip, in which a DNA fragment is fixed to the substrate and, when making measurements, a fluorescence-marked DNA sample is applied thereon for observation under various kinds of microscopes, also falls within this category.

2. Description of the Related Art

In the fields of material sciences and some of life sciences, a specimen such as a powder, biological molecules, or the like, is illuminated through an objective lens, and the reflected light, scattered light, fluorescence, or the like from the specimen is brought to a focus for observation. Various kinds of microscopes using reflected light optics (reflected light illumination) are used (examples include a differential interference contrast microscope, polarized light microscope, an interference microscope, a fluorescence microscope, a confocal microscope, a phase contrast microscope, a near-field optical microscope, and an evanescent microscope). In this case, the specimen to be observed is placed on a slide glass originally designed for observation with transmitted light illumination. If such a slide glass is used for observation in a reflected light optical system, reflections of the slide glass itself, auto fluorescence, etc. become a problem.

In reflected light optical systems, there is no need to place a specimen on a light transmitting substrate such as a slide glass. One possible approach here is to place a specimen for observation, not on a slide glass, but on an opaque plate whose reflections and auto fluorescence are reduced to extremely low levels.

Japanese Unexamined Patent Publication No. 2003-121438 discloses that an amorphous carbon plate, obtained by carbonizing a resin molding by calcination, is used as a substrate for a DNA chip in which a DNA fragment is fixed to the substrate.

When using an opaque material for an optical measurement substrate, it is required that the substrate has an extremely flat surface free from irregularities of micron order so as not to cause a problem for microscope observation. If a substrate plate obtained by calcining a molded resin plate is to be used as an optical measurement substrate, the surface of the plate must be ground flat, but in the case of a plate made only of amorphous carbon (glassy carbon), the surface is extremely hard and is therefore difficult to grind, the resulting problem being that the processing cost, to obtain the required flatness, increases.

SUMMARY OF THE INVENTION

Accordingly, it is an object of the present invention to provide at a relatively low cost a carbon substrate that has an extremely flat surface and is thus suitable for optical measurements.

An optical measurement carbon substrate, according to the present invention, contains glassy carbon and crystalline carbon uniformly dispersed through the glassy carbon.

Preferably, the crystalline carbon is contained in proportions not smaller than 1% by weight but not larger than 40% by weight.

Preferably, the particle size of the crystalline carbon is 10 μm or less.

The glassy carbon is obtained, for example, by carbonizing a thermosetting resin.

The crystalline carbon is at least one material selected from the group consisting, for example, of carbon nanotubes, graphite whiskers, highly oriented pyrolytic graphite, kish graphite, natural graphite, artificial graphite, fullerene, and graphite fiber chop.

The optical measurement carbon substrate of the present invention is fabricated by: mixing crystalline carbon in a liquid composition of a thermosetting resin; molding the mixture into a desired substrate shape while performing control so that graphite is uniformly dispersed therein; and carbonizing the molding in an inert atmosphere, or a non-oxidizing atmosphere, or in a vacuum.

It is desirable that the carbonization includes heat-treating the molding at temperatures of 700° C. to 2800° C.

The optical measurement carbon substrate of the present invention allows the use of a film deposition apparatus such as a coater, as a plate fabricating means, that can fabricate a thin plate-like structure at high speed and in a simple manner, and comprises a composite material of glassy carbon and crystalline carbon (graphite), which facilitates postprocessing such as grinding; accordingly, a product having the surface flatness required of the optical measurement carbon substrate can be provided at very low cost.

Further, as the optical measurement carbon substrate thus fabricated has an opaque structure formed from a composite material of glassy carbon and graphite powder, problems such as reflections by transmitted light can also be solved, unlike the various kinds of glass materials conventionally used for optical measurements; therefore, the substrate of the invention is suitable for use as a substrate when making optical measurements in a reflected light optical system.

BRIEF DESCRIPTION OF THE DRAWINGS

FIG. 9 is a graph showing the results of the measurements of fluorescence and scattering light when irragiated by 488 nm;

FIG. 10 is a graph showing the results of the measurements of fluorescence and scattering light when irragiated by 546 nm; and FIG. 11 is a graph showing the results of the measurements of fluorescence and scattering light when irragiated by 577 nm.

EXAMPLES

Example 1

Figure 1:
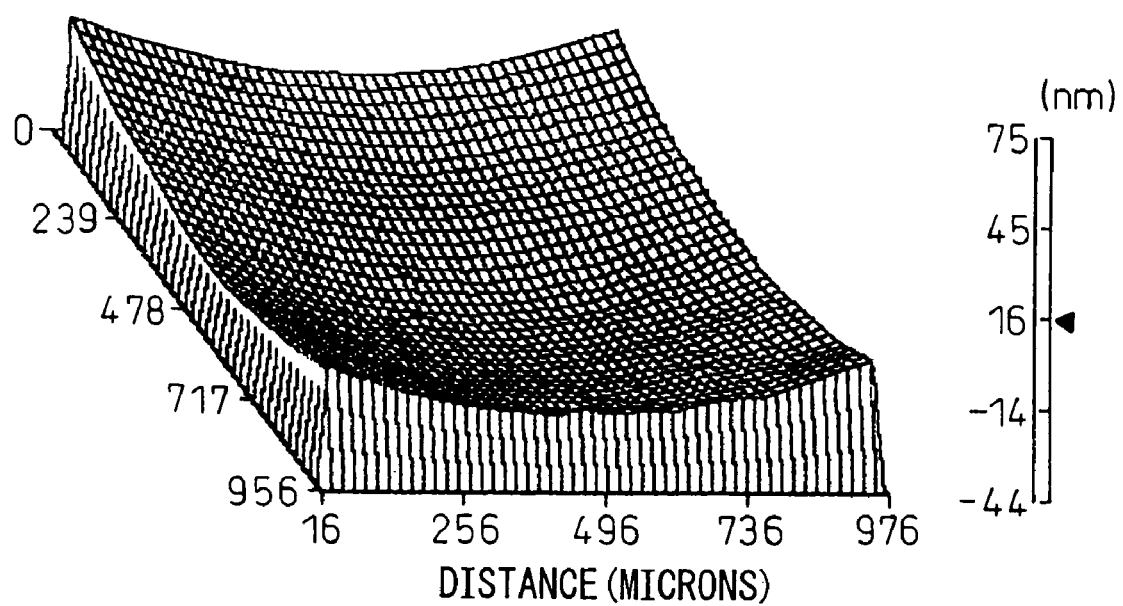
FIG. 1 is a diagram showing the results of the measurements of the surface roughness of a carbon substrate obtained in a first example.
Figure 2:
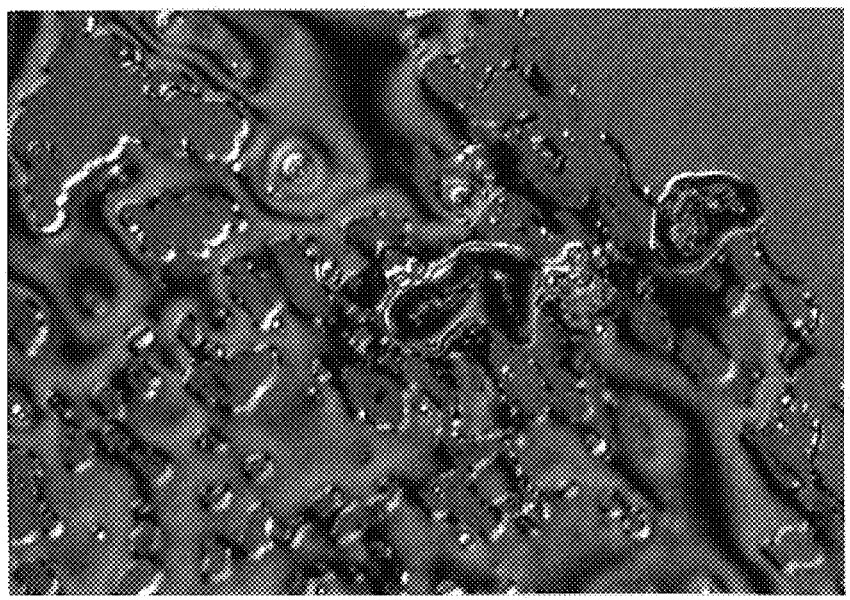
FIG. 2 is a microscope photograph of a fingerprint adhering to the carbon substrate obtained in the first example.
Figure 3:
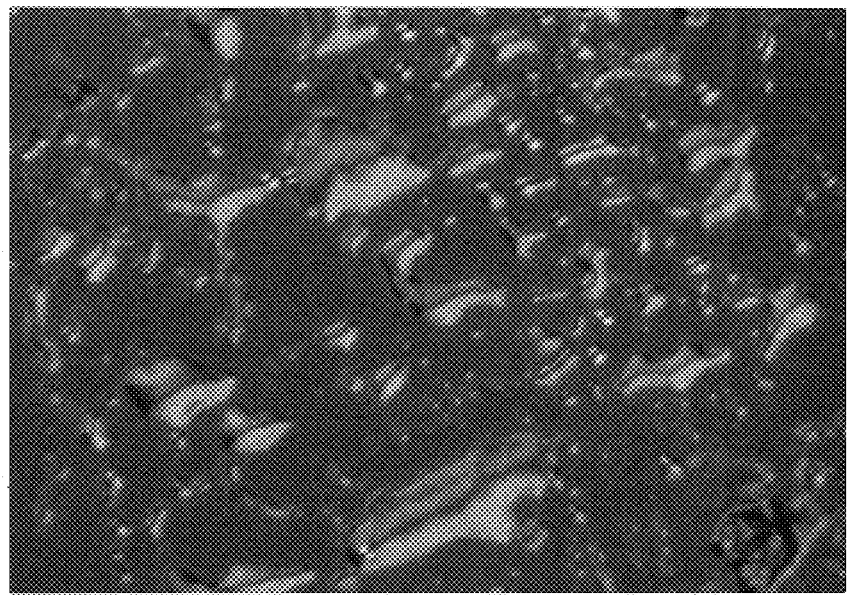
FIG. 3 is a microscope photograph of a fingerprint adhering to a glass substrate.

Eight parts of natural crystalline graphite powder (with an average particle size of 1 μm, manufactured by Nippon Graphite) were added to 92 parts of furan resin (HITAFURAN VF-302 manufactured by Hitachi Chemical), and were thoroughly dispersed and mixed therein to prepare a liquid material for a substrate. Next, the liquid material was charged into a doctor blade type coating machine, and a green sheet was formed by setting the material after coating. The green sheet was then formed into the desired substrate shape, and the thus formed sheet was heated and cured in a drying furnace to obtain a cured plate. The cured plate was 1.5 mm in thickness and rectangular in shape measuring 94 mm×32 mm. The cured plate was then carbonized in a nitrogen gas atmosphere by raising the temperature up to 1000° C. in 50 hours, after which the plate was treated at 1400° C. in a high-temperature vacuum furnace, to obtain a total carbonaceous substrate composed of glassy carbon and graphite in proportions of about 80:20 in terms of weight ratio and having a thickness of 1.2 mm, a rectangular shape of 75 mm×25 mm, and a Shore hardness of 90. The thus obtained substrate was ground to a thickness of 1.0 mm by a surface grinder (using a vacuum chuck) to produce an optical measurement substrate. The surface condition of the thus produced optical measurement substrate is shown in FIG. 1. When a fingerprint as a specimen was made to adhere to the substrate, and was observed under a reflected light optical microscope, the fingerprint on the substrate could be observed extremely clearly (FIG. 2) as compared with the one on a conventional glass substrate (FIG. 3).

Example 2

Figure 4:
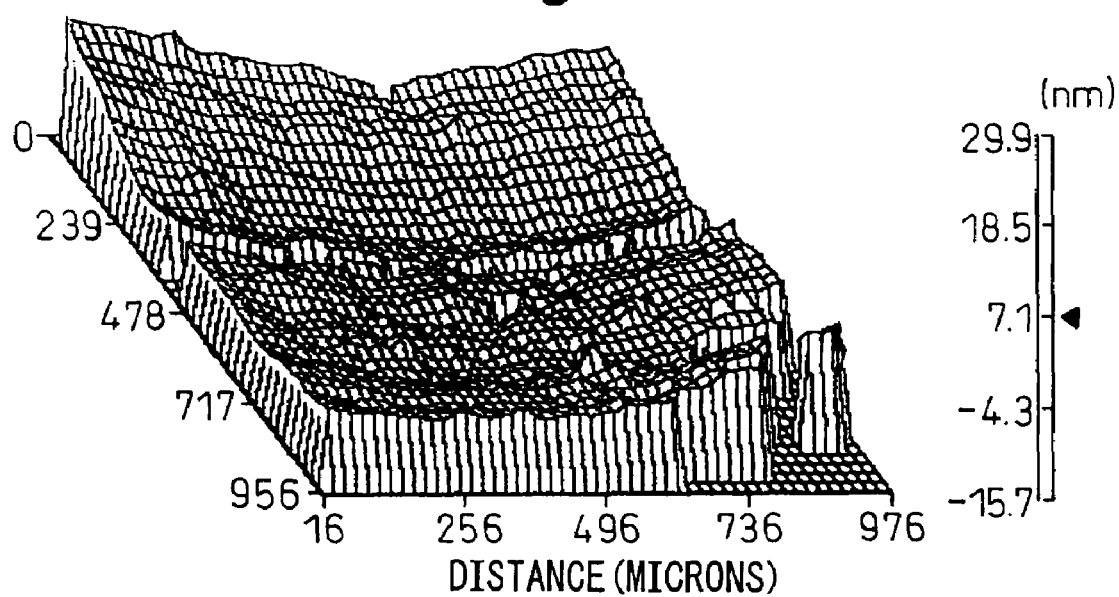
FIG. 4 is a diagram showing the results of the measurements of the surface roughness of a carbon substrate obtained in a second example.
Figure 5:
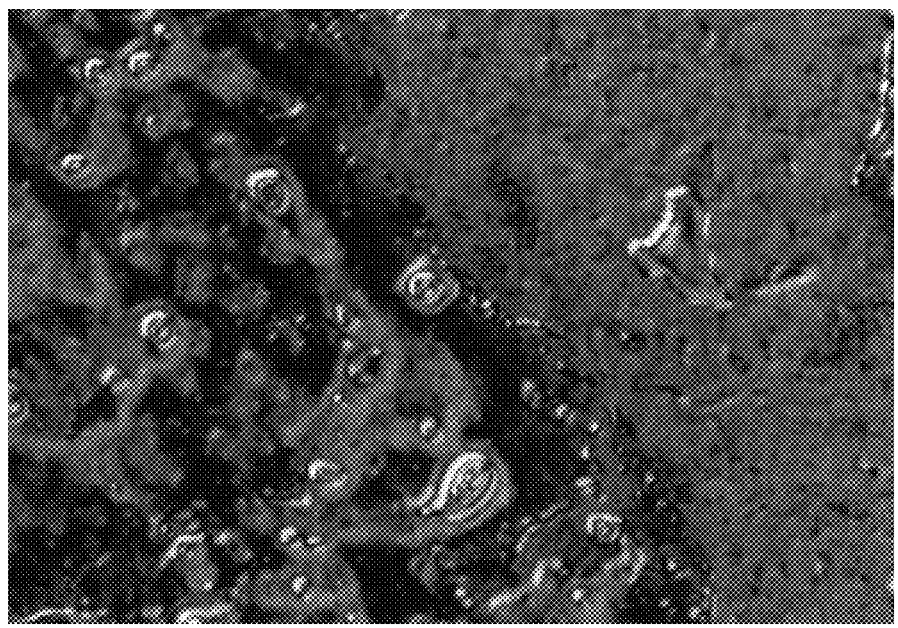
FIG. 5 is a microscope photograph of a fingerprint adhering to the carbon substrate obtained in the second example.

Twenty five parts of natural crystalline graphite powder (with an average particle size of 3 μm, manufactured by Nippon Graphite) were added to 75 parts of furan resin (HITAFURAN VF-302 manufactured by Hitachi Chemical), and were thoroughly dispersed and mixed therein to prepare a liquid material for a substrate; after that, a cured plate was obtained by following the same processing steps as those employed in the first example. The cured plate was 1.45 mm in thickness and rectangular in shape measuring 90 mm×30 mm. The cured plate was then carbonized in a nitrogen gas atmosphere by raising the temperature up to 1000° C. in 50 hours, after which the plate was treated at 1400° C. in a high-temperature vacuum furnace, to obtain a total carbonaceous substrate composed of glassy carbon and graphite in proportions of about 50:50 in terms of weight ratio and having a thickness of 1.2 mm, a rectangular shape of 75 mm×25 mm, and a Shore hardness of 80. The thus obtained substrate was ground to a thickness of 1.0 mm by a surface grinder (using a vacuum chuck) to produce an optical measurement substrate. The condition of the thus produced optical measurement substrate (FIG. 4) was inferior to that of the substrate in the first example (FIG. 1). Further, when a fingerprint was made to adhere to the substrate, and was observed under a reflected light optical microscope, the fingerprint (FIG. 5) could not be observed as clearly as the one in the first example (FIG. 2). From this result, it can be seen that it is desirable that the proportion of the graphite contained in the substrate be held within 40% by weight.

Comparative Example

Figure 6:
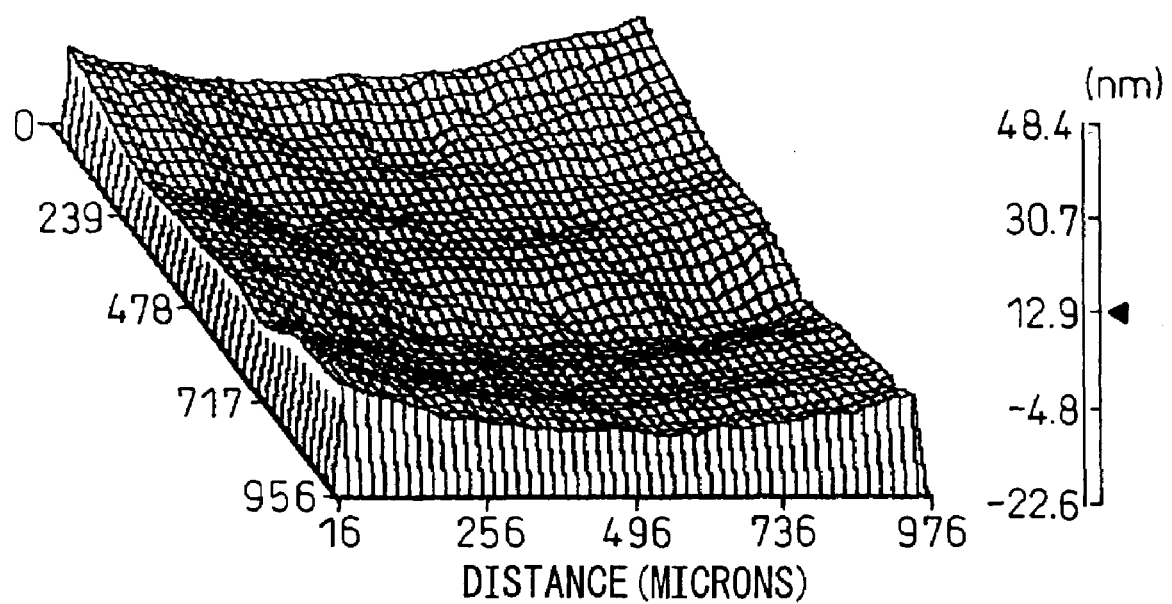
FIG. 6 is a diagram showing the results of the measurements of the surface roughness of a carbon substrate obtained in a comparative example.
Figure 7:
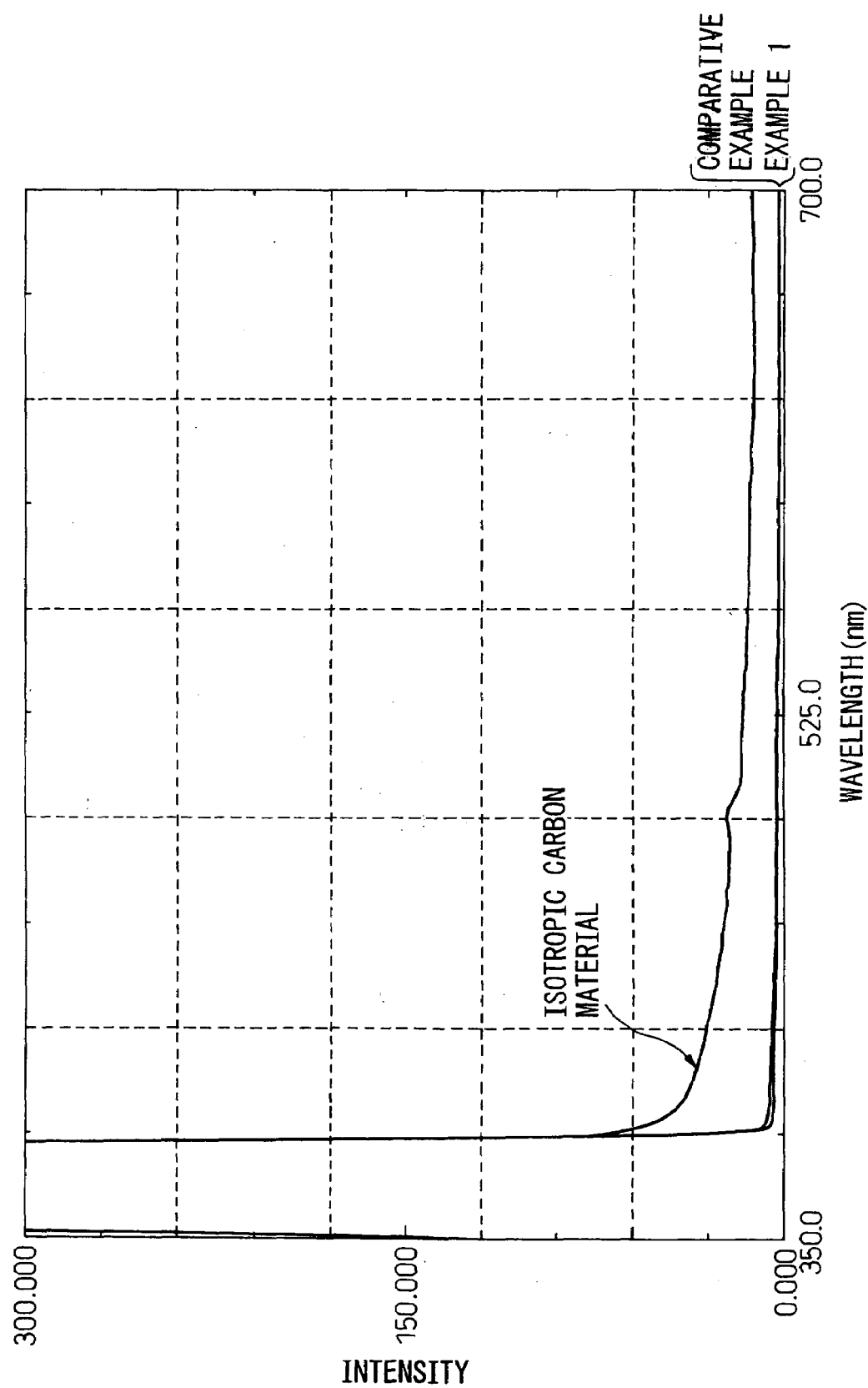
FIG. 7 is a graph showing the results of the measurements of fluorescence and scattering light when irragiated by 365 nm.
Figure 8:
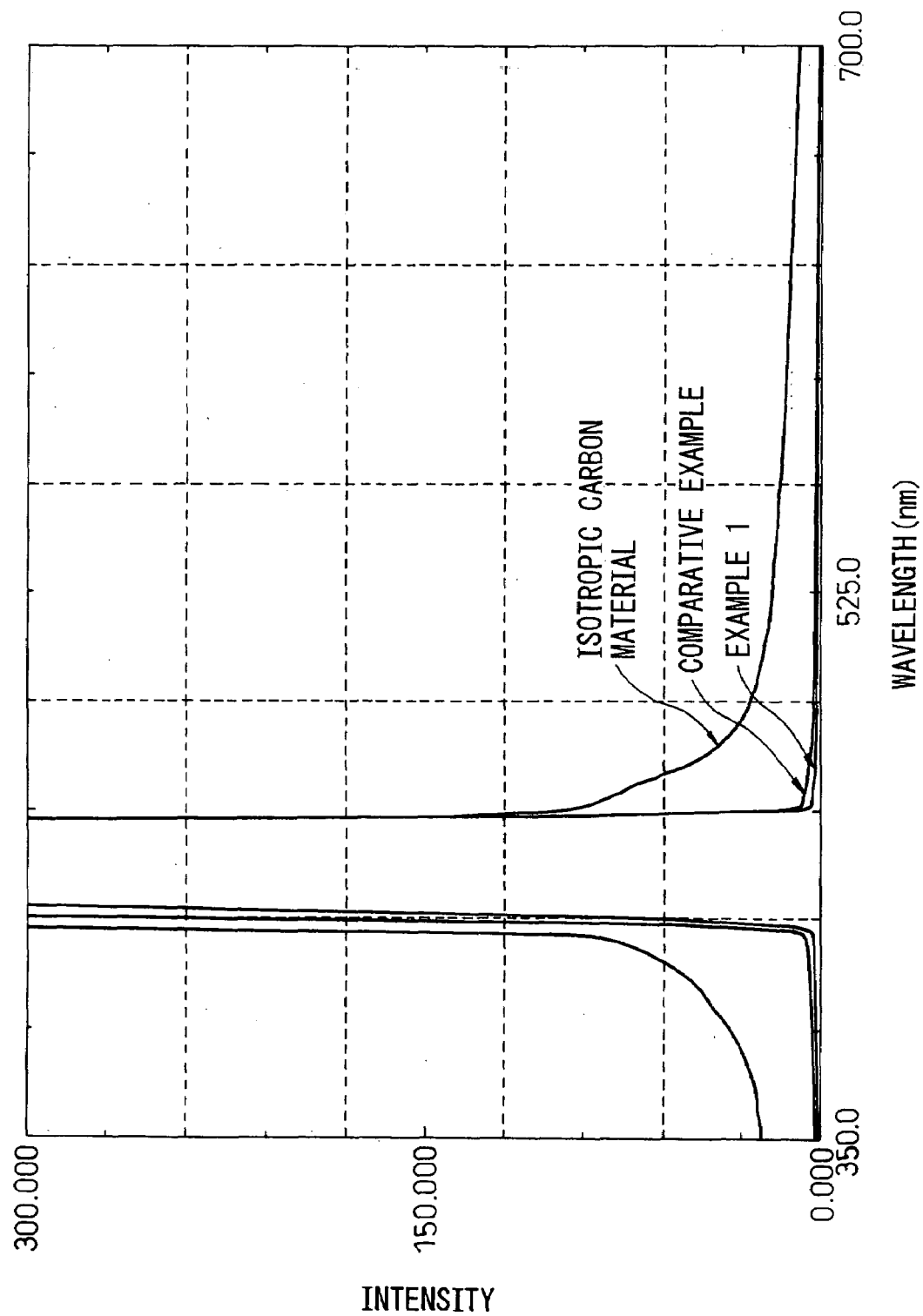
FIG. 8 is a graph showing the results of the measurements of fluorescence and scattering light when irragiated by 435 nm.

A cured plate made only of furan resin (HITAFURAN VF-302 manufactured by Hitachi Chemical), and not containing graphite, was obtained by following processing steps similar to those employed in the first and second examples. The cured plate was 1.6 mm in thickness and rectangular in shape measuring 100 mm×33 mm. The cured plate was then carbonized in a nitrogen gas atmosphere by raising the temperature up to 1000° C. in 100 hours, after which the plate was treated at 1400° C. in a high-temperature vacuum furnace, to obtain a substrate made only of glassy carbon and having a thickness of 1.2 mm, a rectangular shape of 75 mm×25 mm, and a Shore hardness of 130. Then, using the same processing conditions and time as those used in the first and second examples, the substrate was ground by a surface grinder (using a vacuum chuck), to produce an optical measurement substrate. The substrate made only of glassy carbon was hard and was therefore extremely difficult to grind; as a result, using the same processing conditions, the substrate was only able to be ground to about 1.1 mm in thickness, and the condition of the thus produced substrate (FIG. 6) was inferior to that of the substrate in the first example (FIG. 1). Further, when a fingerprint was made to adhere to the substrate, and was observed under a reflected light optical microscope, the fingerprint could not be observed as clearly as the one in the first example.

FIGS. 7 to 11 shows results for a commercially available isotropic carbon material, the optical measurement substrate produced in the first example, and the optical measurement substrate produced in the comparative example when scanning was performed over a range of 350 nm to 700 nm under the excitation wavelengths of 365 nm, 435 nm, 488 nm, 546 nm, and 577 nm, respectively, used in fluorescence measurements. Here, the commercially available isotropic carbon material could not be polished to a mirror finish, because the material was porous.

On the right side of the giant peak of the Rayleigh scattering light, no fluorescence peaks appear at any excitation wavelength. Further, as the Rayleigh scattering peak in the isotropic carbon material is much larger than those in the other two (the first example and the comparative example), the spectra have higher tails than those of the two examples.

The invention claimed is:

1. A fabrication method for an optical measurement carbon substrate, comprising:
   mixing crystalline carbon in a liquid composition of a thermosetting resin;
   molding said mixture into a desired substrate shape while performing control so that the crystalline carbon is uniformly dispersed therein;
   carbonizing said molding in an inert atmosphere or a non-oxidizing atmosphere or in a vacuum; and
   grinding the carbonized substrate.

2. A fabrication method according to claim 1, wherein said carbonization includes heat-treating said molding at a temperature of 700° C. to 2800° C.

* * * * *